July 19, 1949.   D. K. MORRISON   2,476,315
ADJUSTMENT MEANS FOR ENGINE INDICATORS
Filed July 4, 1945   2 Sheets—Sheet 1

INVENTOR.
DAVID K. MORRISON
BY
Ralph L. Chappell

July 19, 1949.                 D. K. MORRISON                 2,476,315
                    ADJUSTMENT MEANS FOR ENGINE INDICATORS
Filed July 4, 1945                                        2 Sheets-Sheet 2

INVENTOR.
DAVID K. MORRISON
BY Ralph L Chappell

Patented July 19, 1949

2,476,315

UNITED STATES PATENT OFFICE 2,476,315

ADJUSTMENT MEANS FOR ENGINE INDICATORS

David K. Morrison, Arlington, Va.

Application July 4, 1945, Serial No. 603,249

7 Claims. (Cl. 116—114)

(Granted under the act of March 3, 1883, as amended April 30, 1928; 370 O. G. 757)

The present invention relates to indicating instruments. More specifically, the invention concerns a new concept in the art of instrument indication, together with certain novel instrumentalities whereby the principles of the invention are put into practice.

In the prior art, mechanisms such as internal-combustion engines have customarily been provided with a plurality of separate and independent instruments to indicate different conditions of temperature, pressure, etc., in the engine, but the various indications have been entirely unrelated, with the result that an evaluation of the performance of the mechanism can be reached only after an analysis of the conditions of operation, and after a study of the reading of each instrument in the light of the operating conditions existing at the moment.

It is one of the principal objects of the invention to provide an instrument wherein all of the essential conditions incident to the operation of a machine are correlated and presented to an observer in a unitary and characteristic pattern, so that an observer familiar with the pattern presented by the instrument during proper machine operation is assured that the mechanism is operating properly as long as the pattern remains unchanged and will recognize instantly any deviations from this pattern as an indication of some malfunctioning of the machine.

Another important object is to provide an instrument wherein various related indications are correlated and presented in a straight-line pattern regardless of the individual quantities involved, so that the several individual indications of the instrument assume a predictable linear relationship with each other in any one of the multitudinous possible combinations of conditions that are encountered during proper functioning of the machine, but wherein any malfunctioning of the machine is apparent instantly by reason of a deviation from the pre-computed ideal relationship.

Other objects and many of the attendant advantages of this invention will be readily appreciated as the same becomes better understood by reference to the following detailed description when considered in connection with the accompanying drawings, in which Fig. 1 is a front elevational view of an engine indicator constructed in accordance with the teachings of this disclosure;

Similar numerals refer to similar parts throughout the several views.

Figure 1:
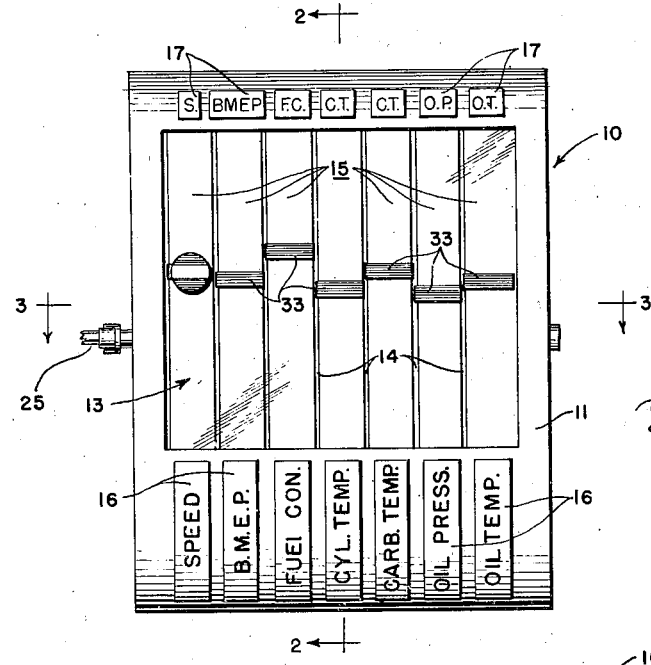
Figure 2:
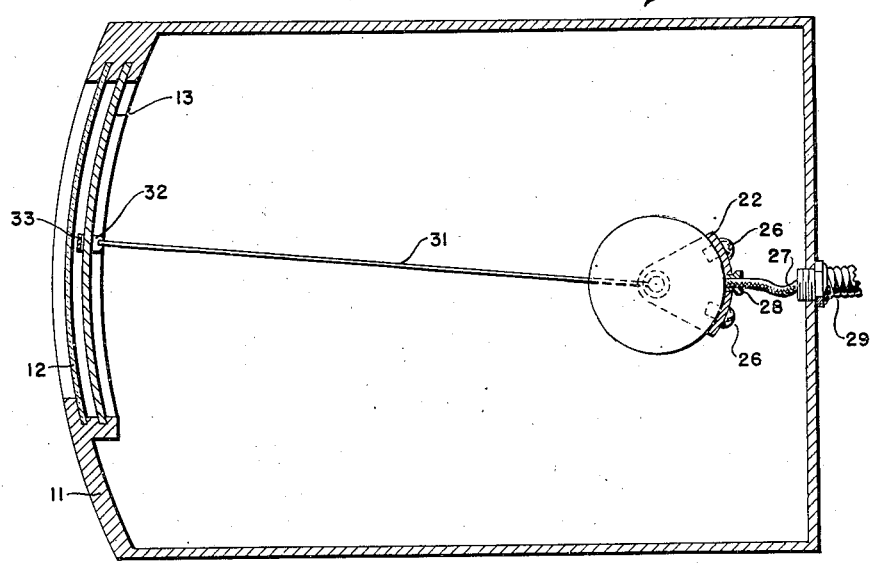
Fig. 2 is a sectional view taken substantially on the plane of the line 2—2 in Fig. 1.
Figure 3:
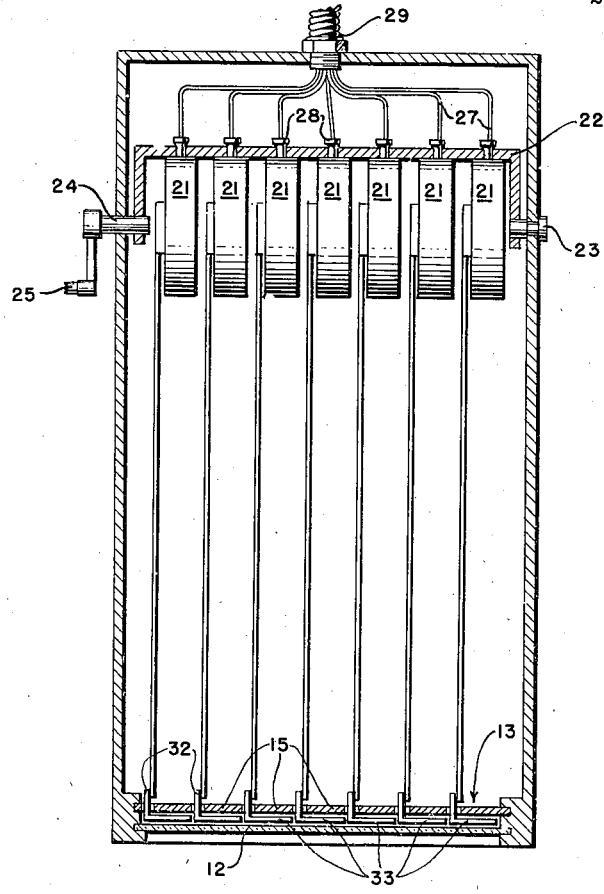
Fig. 3 is a plan sectional view taken substantially on the plane of the line 3—3 in Fig. 1.

The indicator includes an exterior housing or instrument case 10 having a convex front panel 11 provided with a transparent window 12 over a dial 13. The dial 13 consists of a curved plate provided with a plurality of slots 14, so that the individual sections of the dial comprise a series of parallel bands 15. The front face of the instrument panel 11 also carries name plates 16 and indicating tabs 17 associated with each of the bands 15. These plates are lettered to indicate the significance of the individual indication on the band with which the name plate is associated.

The housing 10 encloses indicating means consisting of a plurality of instrument actuators 21, all mounted on a common yoke 22. The yoke 22 is pivoted on a pair of trunnions 23 and 24 so that all of the actuators 21 can be shifted simultaneously by movement of the crank 25. In practice, this crank is linked mechanically to the engine throttle, thrust control, or other power-control means. The individual instrument actuators 21 are secured to the yoke 22 by a pair of mounting screws 26 that extend through slots in the yoke 22, so that each of the actuators 21 can be positioned individually with respect to the yoke. In the form of the invention illustrated, the actuators 21 are depicted as being of the electric type. They are supplied with power through individual flexible leads 27 extending from insulating bushings 28 in the yoke to a flexible cable 29 through which the device is connected electrically with transmitting units on the engine with which the device is associated. Each of the instrument actuators 21 includes a swinging arm 31 extending outwardly from the center of the actuator to the arcuate dial 13. Each arm carries a visual marker in the form of an indicating pointer having a flat portion 32 extending through one of the slots 14 and having its forward portion 33 bent at a right angle so as to lie in a horizontal position and extend across one of the bands 15. These horizontal portions 33 act as visual markers. The arrangement is such that when all of the indicators 31 are energized equally, the visual markers 33 move to an equal height and appear as a straight line across the dial 13.

Figure 4:
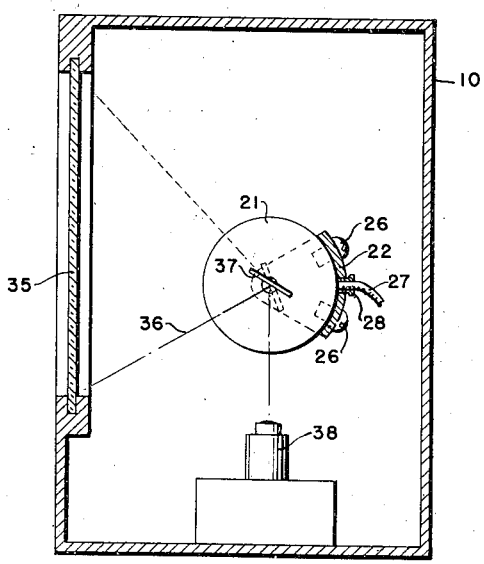
Fig. 4 is a sectional elevational view similar to Figure 2 showing a modified form of the invention.

In the form of the invention illustrated in Fig. 4, the dial consists of a translucent screen 35 and the dial markers consist of light rays 36. The indicator actuators 21 each carries a small reflector 37 instead of the arm 31 and the indication is presented to the dial 35 by the provision of a series of small optical projectors 38 mounted on the inside of the case 10 so that the beam from each projector is reflected from one of the mirrors 37 onto the screen 35. The beams controlled by each instrument actuator move up and down parallel bands of the dial, so that when the actuators are energized equally, the several light beams form a straight band across the dial.

This straight band presents a definite pattern to the eye regardless of whether it is positioned in the lower, upper, or central portion of the dial.

In the operation of an internal-combustion engine, such as an airplane motor, there are many possible combinations of brake mean effective pressure, fuel consumption, cylinder temperature, carburetor temperature, oil pressure, oil temperature, or other conditions that give satisfactory performance under specific conditions of altitude and airspeed. As the basic conditions of speed and altitude are changed, the ideal individual indications also change. However, for any given condition of altitude and airspeed, there are certain ideal relationships existing between the other indicated quantities and means exist for integrating these unit indications so that, whenever the engine is in an ideal operating condition, the unit indications are lined up to form a linear pattern on the face of the dial 13. This does not mean, however, that the visual markers must always assume the same position with respect to the dial, since the base reference of the various indicators can be shifted simultaneously by moving the yoke 22 to correspond to different power conditions. It will be seen, however, that since the markers 33 remain in alignment in any ideal condition of motor functions, the pilot of an aircraft will be able to detect instantly any malfunctioning of his motors by a mere glance at the instrument. Recognition of the linear pattern on the instrument face will be all that is required to assure him that the motor is in an ideal functioning condition. Similarly, it will be apparent that any deviation of an individual indicator from the linear pattern will be apparent instantly, and it will be entirely unnecessary for the pilot to take an exact reading of any instrument or to perform any mental processes to determine whether his motors are operating under proper conditions.

While I have shown and described a form of the invention well-suited to a disclosure of its operating principles, I am aware that it is subject to numerous modifications and variations and therefore wish to be limited only by the scope of the invention as defined in the appended claims.

The invention described herein may be manufactured and used by or for the Government of the United States of America for governmental purposes without the payment of any royalties thereon or therefor.

Having thus described the invention, what I claim as new and desire to secure by United States Patent is:

1. In an engine indicating instrument, in combination, a housing, a dial consisting of an arcuate plate having a plurality of parallel slots, and indicating means; the indicating means including a plurality of separate indicators in side-by-side relationship, each of said indicators consisting of an actuating unit, a swinging arm, and a pointer mounted on the arm at a point remote from the actuator and adapted to swing in a path of movement along the arcuate dial, each of said pointers including a linear portion normal to its direction of movement whereby the pointers may be positioned so that all of the pointers coact to form a pattern indication consisting of a straight line; means comprising a shiftable supporting yoke common to all of the indicators for simultaneously shifting all of the actuators relative to the dial; and means for adjusting the position of any actuator with respect to the shiftable supporting member.

2. In an engine indicating instrument, the combination of a dial and a plurality of separate indicators; each of said indicators having a visible marker adapted to move across the face of the dial in related paths; so that all of said markers may assume individual positions so related to each other that all of the markers coact to form a pattern indication; together with means for simultaneously shifting all of the markers relative to the instrument dial.

3. In an engine indicating instrument, the combination of a dial consisting of a plurality of parallel bands; together with indicating means including a plurality of separate indicators, with actuators in side-by-side relationship; each of said indicators including means for moving a visible marker along the dial so that all of said markers move in parallel paths corresponding to the parallel bands of the dial and so that all the markers coact to form a pattern indication consisting of a straight line; together with means for simultaneously shifting all of the actuators relative to the dial.

4. In an engine indicating instrument, in combination, a housing, a dial consisting of an arcuate plate having a plurality of parallel slots, and indicating means; the indicating means including a plurality of separate indicators in side-by-side relationship, each of said indicators consisting of an actuating unit, a swinging arm, and a pointer mounted on the arm at a point remote from the actuator and adapted to swing in a path of movement along the arcuate dial, each of said pointers including a linear portion normal to its direction of movement whereby the pointers may be positioned so that all of the pointers coact to form a pattern indication consisting of a straight line under one set of predetermined conditions and coact to form a pattern indication consisting of a straight line under other sets of predetermined conditions, means comprising a shiftable supporting yoke common to all of the indicators for simultaneously shifting all of the actuators relative to the dial; and means for adjusting the position of any actuator with respect to the shiftable supporting member.

5. In an engine indicating instrument, the combination of a dial and a plurality of separate indicators; each of said indicators having a visible marker adapted to move across the face of the dial in related paths; so that all of said markers may assume individual positions so related to each other that all of the markers coact to form a pattern indication under one set of predetermined conditions and coact to form a pattern indication under other sets of predetermined conditions; together with means for simultaneously shifting all of the markers relative to the instrument dial.

6. In an engine indicating instrument, a translucent screen forming a dial, a plurality of separate indicator actuators, a plurality of sources of light, a plurality of reflectors each moved by one of said actuators and adapted to project a band of light from one of said sources to said screen so that all of said bands of light can assume individual positions so related to each other that all of the said bands form a predetermined easily recognizable pattern indication under each of a plurality of predetermined conditions, and means for simultaneously shifting all of the bands of light relative said screen.

7. In an engine indicating instrument, a translucent screen forming a dial, a plurality of separate indicator actuators, a plurality of sources of light, a plurality of reflectors each moved by one of said actuators and adapted to project a band of light from one of said sources to said screen so that all of said bands of light can assume individual positions so related to each other that all of the said bands form a predetermined easily recognizable pattern indication under each of a plurality of predetermined conditions, a yoke linked to all of said reflectors, and means for moving said yoke to simultaneously shift all of said bands of light relative said screen.

DAVID K. MORRISON.

REFERENCES CITED

The following references are of record in the file of this patent:

UNITED STATES PATENTS

| Number | Name | Date |
| --- | --- | --- |
| 1,518,786 | Griswold | Dec. 9, 1924 |
| 1,800,210 | Condliffe | Apr. 14, 1931 |
| 1,857,367 | Ellison | May 10, 1932 |
| 1,878,035 | Vickery | Sept. 20, 1932 |
| 2,090,160 | Spitzglass et al. | Aug. 17, 1937 |
| 2,107,936 | Gardner | Feb. 8, 1938 |
| 2,291,610 | Crane | Aug. 4, 1942 |